Patented Nov. 10, 1942

2,301,666

UNITED STATES PATENT OFFICE 2,301,666

MAKING MOLDED ARTICLES FROM ALKALI METAL CYANIDE

Konrad Gabel, Ludwigshafen-on-the-Rhine, Germany; vested in the Alien Property Custodian No Drawing. Application June 1, 1940, Serial No. 338,375. In Germany June 8, 1939

1 Claim. (Cl. 18—55)

The present invention relates to a process for the manufacture of molded articles from alkali metal cyanides.

According to a known process for the manufacture of molded articles from alkali metal cyanides, powders of alkali metal cyanides are molded under such high pressures that the granular structure of the powder vanishes and the moldings assume a crystalline structure whereby their resistance to pressure is considerably increased. In practising this process difficulties are often encountered in the removal of the moldings from the molds.

I have now found that this difficulty may easily be overcome by wetting the inner surfaces of the molds, before the molding is done, with non-oily liquids, as water or aqueous liquids, water containing a little alkali metal cyanide dissolved having proved particularly adapted for the purpose. Moldings free from objection are thus obtained which may easily be removed from the mold, while the use of oily liquids would soil the merchandise and detract from its selling value.

What I claim is:

The process of molding solid alkali metal cyanide by applying pressure which includes the step of moistening the mold with a dilute aqueous solution of alkali metal cyanide.

KONRAD GABEL.